(12) United States Patent
Hibst et al.

(10) Patent No.: US 9,147,877 B2
(45) Date of Patent: *Sep. 29, 2015

(54) PROCESS FOR THE PREPARATION OF CRYSTALLINE LITHIUM-, IRON- AND PHOSPHATE-COMPRISING MATERIALS

(71) Applicant: BASF SE, Ludwigshafen (DE)

(72) Inventors: Hartmut Hibst, Schriesheim (DE); Brian Roberts, South Euclid, OH (US); Jordan Keith Lampert, Ludwigshafen (DE); Kirill Bramnik, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,290

(22) Filed: Dec. 8, 2014

(65) Prior Publication Data

US 2015/0090940 A1 Apr. 2, 2015

Related U.S. Application Data

(62) Division of application No. 12/988,418, filed as application No. PCT/EP2009/054488 on Apr. 16, 2009.

(60) Provisional application No. 61/045,802, filed on Apr. 17, 2008.

(51) Int. Cl.

| H01B 1/02 | (2006.01) |
|---|---|
| H01M 4/525 | (2010.01) |
| C01B 25/30 | (2006.01) |
| H01M 4/48 | (2010.01) |
| C01B 25/45 | (2006.01) |
| H01M 4/62 | (2006.01) |
| H01M 4/58 | (2010.01) |

(52) U.S. Cl.
CPC ............... *H01M 4/48* (2013.01); *C01B 25/30* (2013.01); *C01B 25/45* (2013.01); *H01M 4/525* (2013.01); *H01M 4/5825* (2013.01); *H01M 4/625* (2013.01); *C01P 2006/40* (2013.01); *H01B 1/02* (2013.01)

(58) Field of Classification Search
CPC ..... H01M 4/485; H01M 4/131; H01M 4/525; H01M 4/505; H01B 1/08; H01B 1/18; H01B 1/02; C01B 1/06
USPC ....................... 252/182.1, 506, 519.34, 521.6; 429/221, 231.9, 231.95, 231.6
See application file for complete search history.

(56) References Cited

U.S. PATENT DOCUMENTS

| 6,702,961 | B2 | 3/2004 | Barker et al. | |
|---|---|---|---|---|
| 6,962,666 | B2 | 11/2005 | Ravet et al. | |
| 8,586,241 | B2 * | 11/2013 | Bramnik et al. | 429/221 |
| 2002/0192137 | A1 | 12/2002 | Chaloner-Gill et al. | |
| 2003/0082454 | A1 | 5/2003 | Armand et al. | |
| 2003/0215714 | A1 | 11/2003 | Barker et al. | |
| 2003/0215715 | A1 | 11/2003 | Barker et al. | |
| 2004/0013943 | A1 | 1/2004 | Stoker et al. | |

(Continued)

FOREIGN PATENT DOCUMENTS

| CN | 1547273 | 11/2004 |
|---|---|---|
| DE | 10 2005 012 640 | 9/2006 |
| DE | 10 2005 015 613 | 10/2006 |
| JP | 2005 108681 | 4/2005 |

(Continued)

OTHER PUBLICATIONS

International Search Report issued Aug. 3, 2009 in PCT/EP09/054488 filed Apr. 16, 2009.
New approach for synthesis of carbon-mixed LiFePO4 cathode materials, K. Konstantinov, et al.,, Electrochimica Acta 50, 2004, 421-426.
Office Action issued Jul. 17, 2015, in Korean Patent Application No. 10-2010-7025278, filed Nov. 10, 2010 (English Translation only).

*Primary Examiner* — Mark Kopec
*Assistant Examiner* — Haidung Nguyen
(74) *Attorney, Agent, or Firm* — Oblon, McClelland, Maier & Neustadt, L.L.P.

(57) ABSTRACT

The present application relates to a process for the preparation of compounds of general formula (I)

$$Li_{a-b}M^1{}_bFe_{1-c}M^2{}_cP_{d-e}M^3{}_eO_x \quad (I),$$

wherein $M^1$, $M^2$, $M^3$, a, b, c, d, e and x:
$M^1$: Na, K, Rb and/or Cs,
$M^2$: Mn, Mg, Ca, Ti, Co, Ni, Cr, V,
$M^3$: Si, S,
a: 0.8-1.9,
b: 0-0.3,
c: 0-0.9,
d: 0.8-1.9,
e: 0-0.5,
x: 1.0-8, depending on the amount and oxidation state of Li, $M^1$, Fe, $M^2$, P, $M^3$, wherein compounds of general formula (I) are neutrally charged,
comprising the following steps
(A) providing an essentially aqueous mixture comprising at least one lithium-comprising compound, FeOOH as iron-comprising compound and at least one $M^1$-comprising compound, if present, and/or at least one $M^2$-comprising compound, if present, and/or least one $M^3$-comprising compound, if present, at least one compound comprising at least one phosphorous atom and at least one reducing agent,
(B) drying the mixture provided in step (A), in order to obtain a solid compound and
(C) calcining the solid compound obtained from step (A) or (B) at a temperature of 300 to 950° C.

7 Claims, 4 Drawing Sheets

(56) References Cited

U.S. PATENT DOCUMENTS

| | | |
|---|---|---|
| 2004/0033360 A1 | 2/2004 | Armand et al. |
| 2004/0086445 A1 | 5/2004 | Armand et al. |
| 2004/0175614 A1 | 9/2004 | Wurm et al. |
| 2006/0239883 A1 | 10/2006 | Kang et al. |
| 2007/0134554 A1 | 6/2007 | Armand et al. |
| 2010/0044651 A1 | 2/2010 | Bramnik et al. |
| 2010/0283012 A1 | 11/2010 | Hibst et al. |
| 2010/0301281 A1 | 12/2010 | Hibst et al. |
| 2011/0037032 A1 | 2/2011 | Hibst et al. |
| 2011/0091772 A1 | 4/2011 | Mishima et al. |
| 2011/0272639 A1* | 11/2011 | Bramnik et al. ............. 252/506 |
| 2012/0012797 A1 | 1/2012 | Bramnik et al. |

FOREIGN PATENT DOCUMENTS

| | | |
|---|---|---|
| JP | 2006 347805 | 12/2006 |
| JP | 2007-230784 A | 9/2007 |
| JP | 2008 159495 | 7/2008 |
| JP | 2009-004371 A | 1/2009 |
| JP | 2009-263222 A | 11/2009 |
| JP | 2009-266813 A | 11/2009 |
| KR | 10-2007-0108664 | 11/2007 |
| WO | 02 27824 | 4/2002 |
| WO | WO 2004/082047 A2 | 9/2004 |
| WO | 2005 095273 | 10/2005 |
| WO | 2006 057146 | 6/2006 |

\* cited by examiner

PROCESS FOR THE PREPARATION OF CRYSTALLINE LITHIUM-, IRON- AND PHOSPHATE-COMPRISING MATERIALS

This application is a divisional application of U.S. Ser. No. 12/988,418 filed on Oct. 18, 2010 which is a 371 application of PCT/EP09/54488 filed on Apr. 16, 2009 and which claims to benefit to priority to U.S. 61/045,802 filed on Apr. 17, 2008.

The present invention relates to a process for the preparation of compounds comprising lithium, iron and phosphate-anions, to a process for the preparation of mixtures comprising these compounds and at least one electrically conducting material, to compounds and mixtures, preparable by these processes and the use of these compounds and mixtures for the preparation of cathodes of lithium ion batteries.

Processes for the preparation of $LiFePO_4$ are already known from the prior art.

US 2003/0082454 A1 discloses a method for preparing $LiFePO_4$ by mixing $Li_2CO_3$ or $LiOH.H_2O$, $Fe(CH_3CO_2)_2$ and $NH_4H_2PO_4.H_2O$. The solid mixture is calcined at 300 to 350° C., in order to eliminate $NH_3$, $H_2O$ and $CO_2$. The mixture is subsequently further processed under argon for 24 hours at 800° C. This document mentions further the method of preparing $LiFePO_4$ based material by calcination of a milled mixture comprising $Li_2C_2O_4$, $LiH_2PO_4$ and $Fe(C_2O_4).2H_2O$.

U.S. Pat. No. 6,962,666 B2 discloses a method for preparation of $LiFePO_4$ comprising a carbon-comprising coating, by calcination of a milled mixture consisting of 3% by weight of polypropylene-powder, $Fe_3(PO_4)_2.8\ H_2O$ and $Li_3PO_4$ under argon. The mixture is calcined at 300° C. for 3 hours under argon to dehydrate $Fe_3(PO_4)_2.8\ H_2O$ and is subsequently calcined for 7 hours at 700° C. The polypropylene-powder is a reducing agent to reduce Fe(III) in $Fe_3(PO_4)_2.8\ H_2O$ to Fe(II) in $LiFePO_4$ and to produce carbon at the same time.

U.S. Pat. No. 6,702,961 B2 also discloses a method for the preparation of $LiFePO_4$ by pelletizing a milled mixture consisting of $FePO_4$, $Li_2CO_3$ and carbon, followed by calcination at 700° C. for 8 hours in an inert atmosphere.

The abstract of CN 1547273 A discloses a method for the preparation of $LiFePO_4$ by calcination of a milled and subsequently tablettized mixture of $Li_2CO_3$, $FeC_2O_4.2\ H_2O$ and $(NH_4)_2HPO_4$ with the addition of carbon under microwave radiation.

DE 10 2005 015613 A1 discloses that $LiFePO_4$ can be obtained by hydrothermal treatment of an essentially aqueous mixture comprising $FeSO_4.7\ H_2O$, $H_3PO_4$ and $LiOH.H_2O$ under nitrogen at 160° C. for 10 hours.

DE 10 2005 012 640 A1 discloses that $LiFePO_4$ can be obtained by hydrothermal treatment of precipitated $Fe_3(PO_4)_2.8\ H_2O$ with $Li_3PO_4$ and $Li_2SO_4$ at 160° C. for 10 hours.

WO 2006/057146 A2 discloses that $LiFePO_4$ can be obtained by melting a mixture comprising FeO, $P_2O_5$ and LiOH at 1100° C. under argon, followed by milling.

US 2004/0013943 discloses a process for the preparation of an active material for electrodes or batteries, in which a carbon containing reducing agent is added to a mixture comprising an alkali metal and a compound comprising a transition metal.

The processes for the preparation of $LiFePO_4$ according to the prior art bear the drawback that the calcination step has to be conducted in a reducing atmosphere. Because the reducing agent carbon acts as a reducing agent only at high reaction temperatures, high calcination temperatures are necessary which lead to a material with large crystal grains and with a broad particle size distribution. Other disadvantages are that if solid compounds like $Li_2CO_3$ and $Fe_2O_3$ are mixed in solid phase, it is difficult to obtain a mixture having a homogenous dispersion of the different ions throughout the whole mixture.

The object of the present invention is to provide a process for the preparation of lithium-iron-phosphate which makes it possible to obtain these compounds in a very homogenously mixed and crystalline state. In addition, it is an object of the present invention to provide a process for the preparation of the mentioned compounds which can be conducted easily and with only a few reaction steps. Moreover, it is object of the present invention to provide a process for the preparation of lithium-iron-phosphate, in which the applied calcination temperature can be decreased to 500° C. or less to prepare a single-phase lithium-iron-phosphate. It is therefore a further object to obtain a more finely dispersed material with a very narrow size distribution of the crystallites, supplying improved Li-ion diffusivity in the charging and discharging of a Li-ion battery, in order to improve the Li-ion diffusivity and therewith the power characteristics and additionally to increase the capacity of a Li-ion battery. It is a further object to obtain a material with morphology of porous spheres in which a plurality of crystalline primary particles is aggregated.

These objects are achieved by a process for the preparation of compounds of general formula (I)

$$Li_{a\text{-}b}M^1{}_bFe_{1\text{-}c}M^2{}_cP_{d\text{-}e}M^3{}_eO_x \qquad (I),$$

wherein $M^1$, $M^2$, $M^3$, a, b, c, d, e and x:

$M^1$: Na, K, Rb and/or Cs,
$M^2$: Mn, Mg, Ca, Ti, Co, Ni, Cr and/or V,
$M^3$: Si and/or S,
a: 0.8-1.9,
b: 0-0.3,
c: 0-0.9,
d: 0.8-1.9,
e: 0-0.5,
x: 1.0-8, depending on the amount and oxidation state of Li, $M^1$, Fe, $M^2$, P, $M^3$, wherein compounds of general formula (I) are neutrally charged, comprising the following steps (A) providing an essentially aqueous mixture comprising at least one lithium-comprising compound, FeOOH as iron-comprising compound and at least one $M^1$-comprising compound, if present, and/or at least one $M^2$-comprising compound, if present, and/or least one $M^3$-comprising compound, if present, at least one compound comprising at least one phosphorous atom and at least one reducing agent, (B) drying the mixture provided in step (A), in order to obtain a solid compound and (C) calcining the solid compound obtained from step (A) or (B) at a temperature of 300 to 950° C.

In a preferred embodiment, $M^1$, $M^2$, $M^3$, a, b, c, d, e and x have the following meanings:

$M^1$: Na,
$M^2$: Mn, Mg, Ca, Ti, Co, Ni,
$M^3$: Si, S
a: 0.6-1.6, particularly preferred 0.9-1.3,
b: 0-0.1,
c: 0-0.6, particularly preferred 0-0.3
d: 0.6-1.6, particularly preferred 0.9-1.3
e: 0-0.3, particularly preferred 0-0.1
x: 2.0-6, depending on the amount and oxidation state of Li, $M^1$, Fe, $M^2$, P, $M^3$, wherein compounds of general formula (I) are neutrally charged.

For example, in a very preferred embodiment, $M^1$, $M^2$ and $M^3$ are absent, in order to have a neutrally charged compound of general formula (I) $LiFePO_4$, in which Fe is in oxidation state +2. Therefore, in a very preferred embodiment, the process according to the present invention is conducted in order to obtain the compound of formula LiFePO$_4$.

In further preferred embodiments, M$^1$, being for example Na, is present in an amount of up to 10 mol %, in respect of the sum of Li and M$^1$. In another preferred embodiment, M$^2$, being for example Mn, is present in an amount of up to 30 mol %, in respect of the sum of iron (II) and M$^2$ present in the compound. In another preferred embodiment, M$^3$, being for example Si, is present in an amount of up to 10 mol %, in respect of the sum of phosphorous and M$^3$.

Process steps (A), (B) and (C) are explained in the following in more detail:

Step (A):

Step (A) of the process according to the present invention comprises providing an essentially aqueous mixture comprising at least one lithium-comprising compound, FeOOH as iron-comprising compound and at least one M$^1$-comprising compound, if present, and/or at least one M$^2$-comprising compound, if present, and/or least one M$^3$-comprising compound, if present, at least one compound comprising at least one phosphorous atom and at least one reducing agent.

The mixture which is provided in Step (A) of the process according to the present invention is essentially aqueous, for example an essentially aqueous solution, dispersion or slurry.

In general, all Li-, M$^1$-, M$^2$- and M$^3$-comprising compounds known to a person having ordinary skill in the art which are able to be incorporated in the mixture in step (A) of the process can be used in the process according to the present invention.

The Li-comprising compound in step (A) is preferably chosen from the group consisting of lithium hydroxide LiOH, lithium hydroxide-hydrate LiOH.H$_2$O, lithium acetate LiOAc, lithium carbonate Li$_2$CO$_3$, lithium phosphates like LiH$_2$PO$_4$, Li$_2$HPO$_4$, Li$_3$PO$_4$, LiH$_2$PO$_3$, Li$_2$HPO$_3$, Li$_3$PO$_3$, LiH$_2$PO$_2$, and mixtures thereof. In a very preferred embodiment, lithium hydroxide LiOH and/or lithium hydroxide-hydrate LiOH.H$_2$O and/or lithium carbonate Li$_2$CO$_3$ are used as lithium-comprising compounds in step (A) of the process according to the present invention. Two particularly preferred lithium-comprising compounds are lithium hydroxide LION and lithium hydroxide-hydrate LiOH H$_2$O.

The at least one lithium-comprising compound is added to the mixture in step (A) in the process according to the present invention in a concentration of in general 0.04 to 4 mol Li/L, preferably 0.1 to 2.0 mol Li/L, particularly preferred 0.2 to 1.5 mol Li/L, based on the whole reaction mixture in each case.

Iron-(III)-oxide hydroxide FeOOH is used as the iron-containing compound. FeOOH is preferably chosen from the group consisting of α-FeOOH, β-FeOOH, γ-FeOOH and mixtures thereof. Preferred are the α-, and γ-modification of iron(III)-oxide hydroxide (FeOOH). α-FeOOH is especially preferred.

In a preferred embodiment, FeOOH is present in a needle-shaped habitus, particularly preferred having a ratio of length to thickness of >1.5, preferably >2, particularly preferred >5.

The advantage of the use of FeOOH, preferably in a needle-shaped habitus, is that in the mixture comprising at least one lithium-comprising compound, at least one phosphorous comprising compound, very short diffusion pathways are present which make it possible to obtain the compound according to general formula (I) very homogeneously and in a single phase. The Fe(III)-cations can easily move between lithium and phosphorous atoms in order to reach the right places in the crystal, which is not that easy, if different Fe-containing compounds are used.

The at least one iron-comprising compound is added to the mixture in step (A) in the process according to the present invention in a concentration of in general 0.04 to 4.0 mol Fe/L, preferably 0.1 to 2.0 mol Fe/L, particularly preferred 0.2 to 1.5 mol Fe/L, based on the whole reaction mixture in each case.

The at least one M$^1$-comprising compound, if present, is preferably chosen from the group consisting of sodium hydroxide NaOH, sodium hydroxide-hydrate NaOH.H$_2$O, sodium acetate NaOAc, sodium carbonate Na$_2$CO$_3$, and mixtures thereof. In a very preferred embodiment, sodium hydroxide NaOH and/or sodium hydroxide-hydrate NaOH.H$_2$O and/or sodium carbonate Na$_2$CO$_3$ are used as sodium-comprising compounds in step (A) of the process according to the present invention. Two particularly preferred sodium-comprising compounds are sodium hydroxide NaOH and sodium hydroxide-hydrate NaOH.H$_2$O.

The at least one M$^2$-comprising compound, if present, is preferably chosen from compounds having the required cation and an anion chosen from hydroxide, acetate, oxide, carbonate, halogenide, like fluoride, chloride, bromide, iodide, nitrate, and mixtures thereof. In a very preferred embodiment, the anion of the at least one M$^2$-comprising compound is acetate, oxide, hydroxide, carbonate, nitrate, or mixtures thereof.

The at least one M$^3$-comprising compound, if present, is preferably chosen from H$_2$SO$_4$, (NH$_4$)HSO$_4$, (NH$_4$)$_2$SO$_4$, LiHSO$_4$, Li$_2$SO$_4$, finely divided SiO$_2$, e.g. in form of a sol, H$_4$SiO$_4$, Li-silicate, and mixtures thereof.

M$^1$-, M$^2$-, and/or M$^3$-comprising compounds are added to the essentially aqueous mixture, if present, in amounts, in which they are present in compounds of formula (I). A person having ordinary skill in the art knows how to calculate the required amount.

In a preferred embodiment, the at least one reducing agent that is added in step (A) of the process according to the present invention, is water soluble. According to the present invention "water soluble" means that at least 50% of the reducing agent that is added to the essentially aqueous mixture is dissolved.

In a further embodiment of the process according to the present invention, the at least one reducing agent is carbon free. According to the present invention, carbon free means that no carbon atoms in oxidation state 0 are present in the reducing agent. An advantage of a carbon free reducing agent is that the reduction can be conducted at low temperatures like 300 or 350° C., whereas carbon in elemental form as reducing agent makes temperatures necessary of 600° C. and higher. These low temperatures make it possible to obtain nano-crystalline materials. Nano-crystalline materials can not be obtained advantageously at high temperatures which are necessary if carbon is used as the reducing agent.

In a preferred embodiment, the at least one reducing agent which is carbon free and which is added in step (A) of the process according the present invention is preferably selected from the group consisting of hydrazine or derivatives thereof, hydroxyl amine or derivatives thereof. Examples of derivatives of hydrazine are hydrazine-hydrate, hydrazine-sulfate, hydrazine-dihydrochloride and others. An example of a derivative of hydroxyl amine is hydroxyl amine-hydrochloride. Particularly preferred carbon-free reducing agents are hydrazine, hydrazine-hydrate, hydroxyl amine or mixtures thereof.

In an other preferred embodiment the at least one reducing agent contains carbon, for example chosen from the group consisting of reducing sugars, like glucose, saccharose (sucrhose) and/or lactose, alcohols like aliphatic alcohols having 1 to 10 carbon atoms, like methanol, ethanol, propanols, for example n-propanol or iso-propanol, butanols, for example n-butanol, iso-butanol, ascorbic acid, and compounds comprising easily oxidisable double bonds, and mixtures thereof.

The at least one water soluble reducing agent containing carbon is preferably oxidized to carbon (0) in order to have carbon present in mixture with the compound of general formula (I), in order to increase electrical conductivity. The amount of carbon present in the compound of general formula (I) is for example 0.1 to 20% by weight, preferably 0.5 to 15% by weight, in each case in respect of the compound according to general formula (I).

The at least one reducing agent is added to the mixture in step (A) in the process according to the present invention in a concentration of preferably 0.01 to 1.0 mol/mol Fe.

The process according to the present invention is preferably conducted by introducing at least one water soluble reducing agent into the mixture in step (A) of the process according to the present invention. Based on this there is a need that at least one compound has to be added in step (A) of the process according to the present invention comprising at least one phosphorous atom, preferably in oxidation state +5, delivering $PO_4^{3-}$-anions, which are needed in order to obtain the $PO_4^{3-}$-comprising compound of general formula (I).

Preferred compounds comprising at least one phosphorous atom in oxidation state +5 which are added in step (A) are chosen from the group consisting of $H_3PO_4$, $(NH_4)H_2PO_4$, $(NH_4)_2HPO_4$, $(NH_4)_3PO_4$, $Li_3PO_4$, $LiH_2PO_4$, $Li_2HPO_4$ and mixtures thereof. Particularly preferred is $H_3PO_4$.

The at least one compound comprising at least one phosphorous atom is added to the mixture in step (A) in the process according to the present invention in a concentration of in general 0.04 to 4.0 mol P/L, preferably 0.1 to 2.0 mol P/L, particularly preferred 0.2 to 1.5 mol P/L, based on the whole reaction mixture in each case.

In a preferred embodiment, the at least one lithium-comprising compound, FeOOH as the iron-comprising compound, the at least one compound comprising at least one phosphorous atom and the at least one reducing agent are added to the, preferably essentially aqueous, mixture in amounts that are adjusted in a way that the stoichiometry according to general formula (I) is obtained. A person having ordinary skill in the art does know how to calculate the necessary amounts. In another preferred embodiment of the present invention, the at least one lithium-comprising compound is added in an amount that is ≥1% by weight, preferably ≥2% higher than the stoichiometric amount according to general formula (I).

The mixture which is provided in step (A) of the process according to the present invention is essentially aqueous. The wording "essentially" in this application has the meaning that more than 50% by weight, preferably more than 65% by weight, particularly preferably more than 80% by weight of the solvent, which is used to provide the essentially aqueous mixture in step (A) of the process according to the present invention, is water.

In addition to water, further solvents that are miscible with water can be present. Examples of these solvents are aliphatic alcohols having 1 to 10 carbon atoms like methanol, ethanol, propanols, for example n-propanol or iso-propanol, butanols, for example n-butanol, iso-butanol. According to the present invention, alcohols can be added as water soluble reducing agent and/or as additional solvent.

In a very preferred embodiment, the solvent that is used in step (A) of the process according to the present invention is water without any additional solvents. The solvent, preferably water, is added in amount that the mixture that is obtained in step (A) of the process according to the present invention is a slurry, a dispersion or preferably a solution.

The order, in which the different components are added to the solvent or mixture of solvents in step (A), is not determined. In a preferred embodiment, the lithium-comprising compound is added first to the solvent, FeOOH as the iron-comprising compound, is added as the second component. The at least one reducing agent and the at least one compound having at least one phosphorous atom are added subsequently.

In a preferred embodiment of the present invention, the mixture obtained from step (A) of the process according to the present invention is an essentially aqueous solution or dispersion of at least one lithium-comprising compound, FeOOH as the iron-comprising compound, at least one compound comprising at least one phosphorous atom and at least one water soluble reducing agent.

Step (A) can be conducted in all suitable reactors that are known to a person skilled in the art. Step (A) can be conducted continuously or discontinuously.

The temperature, under which step (A) of the process according to the present invention is conducted is 10 to 120° C., preferably 60 to 100° C., particularly preferably 40 to 95° C. If temperatures higher than 100° C. are used, the essentially aqueous reaction mixture has to be present in a pressure-resistant reactor, because of the boiling point of water. To increase the homogeneity of the mixture, mixing is conducted at elevated temperature and optionally under the application of shearing force, for example by the use of an ultrathurax.

In a preferred embodiment the mixture is stirred in step (A) for a time of 0.05 to 80 hours, particularly preferred 0.5 to 20 hours. The pH-value of the mixtures to the end of stirring is in general below pH 11, preferably below pH 10, for example at pH 2.0 to 8.0.

Step (A) of the process according to the present invention can be conducted under air or under an inert atmosphere. Examples of inert gases are nitrogen, noble gases like helium or argon. In a preferred embodiment, step (A) is conducted under a nitrogen atmosphere.

Reduction of most of the $Fe^{3+}$ to $Fe^{2+}$ is in general conducted in step (B) and/or step (C), preferably in step (C), of the process according to the present invention. It is also possible that reduction immediately starts in step (A) after addition of the reducing agent to the mixture. It is further possible that reduction starts after the essentially aqueous mixture is heated to an increased temperature of 40 to 100° C., preferably 60 to 95° C.

Step (B):

Step (B) of the process according to the present invention comprises drying the mixture provided in step (A), in order to obtain a solid compound.

In step (B), the essentially aqueous mixture obtained from step (A) is converted into a solid compound. The drying of the mixture provided in step (A) of the process according to the present invention can be conducted with all methods known to a person having ordinary skill in the art and which are suitable for the removal of water of an essentially aqueous mixture of the components as mentioned above.

Preferred methods for drying the mixture from step (A) in step (B) are spray-drying, freeze-drying or combinations thereof. According to the present invention, the drying in step (B) can be conducted only by spray-drying, only by freeze-drying or by a combination of spray-drying and freeze-drying, in both orders. Step (B) of the process according to the present invention is preferably conducted by spray-drying.

Spray-drying in step (B) preferably causes that spherical agglomerates of the compound of general formula (I), preferably LiFePO$_4$, are obtained.

Spray-drying is in general conducted by passing the mixture obtained from step (A) through one or more narrow nozzles, wherein fine drops are obtained which are dried by a stream of hot air or nitrogen or hot mixtures of air, nitrogen, pure oxygen, argon, helium, hydrogen, preferably hot air or hot nitrogen or a hot mixture of air and nitrogen and optionally oxygen, particularly preferred hot air. Alternatively the spraying can be achieved via a rotating disc, which is preferred. In a preferred embodiment a stream of hot air or nitrogen is used having a temperature of 100 to 500° C., particularly preferred 110 to 350° C. Spray-drying is normally conducted directly with the mixture of step (A) without any intermediate steps. Spray-drying normally gives rise to spherical agglomerates having an average diameter of <0.5 mm, e. g. 15-300 μm, preferably 20-200 μm, particularly preferred 30-150 μm. In order to obtain comparably small spherical agglomerates having an average diameter of 3-50 μm in a preferred embodiment of step (B) diluted solutions can be used and spray-drying of these diluted solutions can be conducted using high pressure nozzles. To increase the dilution of the solution, in general additional water is added.

In a second embodiment, step (B) of the process according to the present invention is conducted by freeze-drying. The sprayed mixture is therefore sprayed into, for example liquid nitrogen. The spherical particles and agglomerates obtained therefrom can be dried in vacuum at a low temperature.

The drying in step (B) is conducted in order to obtain a dry solid. In a preferred embodiment, the drying in step (B) of the process according to the present invention is conducted in order to obtain a solid having an amount of water present in the solid of less than 50% by weight, preferably less than 35% by weight, particularly preferably less than 25% by weight.

After step (B) the desired solid is present in preferably spherical agglomerates having a diameter of 3 to 300 μm, preferably 6 to 200 μm, very preferably 10 to 150 μm.

Step (C):

Step (C) of the process according to the present invention comprises calcining the solid compound obtained from step (B) at a calcination temperature of 300 to 950° C. Step (C) is preferably conducted at a calcination temperature of 480 to 900° C., particularly preferably at a calcination temperature of 490 to 850° C.

If calcinations temperatures above 850° C., for example 950° C., are applied, the at least a part of the spherical agglomerates which are obtained by the process according to the present invention decompose at least partially into primary particles, which are not desired. Therefore, in a preferred embodiment calcinations temperatures above 850° C. should be avoided.

Calcination is in general conducted under an inert gas atmosphere. Examples of inert gases are nitrogen, technical nitrogen comprising traces of oxygen or noble gases like helium and/or argon. In a preferred embodiment, nitrogen is used in step (C) of the process according to the present invention.

One advantage of the process according to the present invention is that calcination can be conducted under an inert atmosphere and no need exists to conduct step (C) under a gaseous reducing atmosphere according to the prior art. Based thereon the process according to the present invention can be conducted in a more time and cost saving way. The absence of a reducing agent, for example hydrogen, avoids the presence of explosive gaseous mixtures. If the nitrogen used in the calcination step comprises higher amounts of oxygen, it is possible to add reducing gases like CO or hydrogen to the oxygen comprising nitrogen.

Step (C) of the process according to the present invention is conducted for a time of 0.1 to 8 hours, preferably 0.5 to 3 hours. In a preferred embodiment of step (C), the calcination temperature is hold for a period of 0.1 to 2 hours, very preferably 0.5 to 1.5 hours, and at the end the temperature is decreased to room temperature.

In a preferred embodiment, the product obtained from step (C) consists essentially of spherical agglomerates having a diameter of 3 to 300 μm, preferably 6 to 200 μm, very preferred 10 to 150 μm. An investigation with different analytical tools like SEM or TEM shows, that the spherical agglomerates consist of crystalline primary particles and, in addition, comprise pores. The amount of porosity is depending on different criteria like smallness of FeOOH particles, ratio between length and width of the needle shaped FeOOH particles, concentration of the solution, dispersion or slurry that is used in step (A), speed of spray-drying in step (B), which is further depending on the temperature of the gas used, and in addition configuration of the spray-tower used. Total porosity in the spherical agglomerates is in general 3-85%, preferably 5-70%, particularly preferred 5-50%.

The temperature of calcination has a significant impact onto the specific surface of the compound according to general formula (I). Low temperatures during calcination give normally rise to high specific surface area. High temperatures during calcination give usually rise to low specific surface area.

The spherical particles or agglomerates that are obtained from step (C) of the process according to the present invention have in general a specific BET surface area of 0.01 to 50 m$^2$/g, preferably 0.1 to 40 m$^2$/g. The present invention further relates to spherical particles or agglomerates comprising at least one compound of general formula (I) obtainable by the process according to the present invention. These spherical particles or agglomerates have characteristics as mentioned above.

The spherical particles or agglomerates that are obtained in step (C) of the process according to the present invention can optionally comprise further elements, for example carbon, that are optionally obtained by pyrolysis of the reducing agent, for example, a sugar.

Step (C) of the process according to the present invention can be conducted continuously or discontinuously. In a preferred embodiment the process according to the present invention is conducted continuously. Suitable apparatuses for step (C) are known to the person having ordinary skill in the art. One example for a discontinuous or continuous calcination is a rotary furnace. In case of continuous calcination the residence time in a rotary furnace is based on the inclination and the rotating speed of the furnace. A person having ordinary skill in the art does know how a suitable residence time is adjusted in the rotary furnace. In a preferred embodiment the solid that is calcinated in step (C) of the process according to the present invention is moved during calcination, for example in a fluidized bed reactor or in a rotary furnace. The solid can also be stirred during calcination. The rotary furnace can comprise different temperature zones. For example, in a first zone the temperature is adjusted to a low temperature in order to drain the spray dried powder, whereas in another zone a higher calcination temperature is present. The speed of heating of the powder is depending on the temperatures in the different zones and on the speed with which the powder is moved in the furnace.

Step (C) of the process according to the present invention is in general conducted under a pressure that is suitable that preferably complete conversion into the desired products is obtained. In a preferred embodiment step (C) is conducted under a pressure which is slightly higher than atmospheric pressure, in order to prevent oxygen penetrating the reactor from the outside. This slightly increased atmospheric pressure is preferably caused by at least one inert gas that is streaming over the solid compound that is calcinated in this step.

Depending on the composition of the electrode which can be prepared from the compound of general formula (I) and on the desired electrochemical properties of the resulting lithium-ion battery, it can be advantageous, according to the present application, if the solid compound obtained from step (B) is mechanically treated prior to step (C) and/or if the solid compound obtained from step (C) is mechanically treated after step (C), in order to destroy the spherical agglomerates into smaller and more dense agglomerates having the required size or into the primary particles. Suitable mills are known to a person having ordinary skill in the art. Examples are jet mills which supply very low abrasion, preferably under the use of nitrogen and/or air. For milling of the calcinated product also wet milling processes may be advantageous, for example by the use of a bead mill. Further suitable apparatuses are compactors and/or rollings.

The present invention further relates to a compound, preferably with a spherical morphology according to general formula (I) as mentioned above, preparable by the process according to the present invention. These compounds having a spherical morphology having the characteristic features like diameter and porosity as mentioned above. These spherical particles preferably consist of crystalline primary particles, which preferably show essentially the crystal structure of $LiFePO_4$. These primary particles with a composition according to general formula (I) preparable by the process according to the present invention show improved crystallinity compared to compounds prepared by processes according to the prior art. In addition the size distribution of the primary particles obtained is narrower compared to the prior art. The crystallinity of the primary particles obtained is improved and the solids obtained have an improved dispersion of ingredients. Moreover, the invention enables a significant decrease of the usually applied high calcination temperature of 800° C. and more to prepare a single phase lithium-iron-phosphate. A decrease of the calcination temperature in general leads to a more finely divided material with a very narrow size distribution of the crystallites, supplying improved Li-ion diffusivity in the charging and discharging of a Li-ion battery. By improving the Li-ion diffusivity the power characteristics and additionally the capacity of a Li-ion battery can be increased.

Because of these facts the materials according to the present invention of general formula (I) preparable by the process according to the present invention are particularly suitable for the use for the preparation of a cathode of a lithium-ion battery or an electrochemical cell. Therefore the present invention also relates to the use of a spherical particle or agglomerate or of a compound of general formula (I) obtainable/preparable by the process according to the present invention for the preparation of a cathode of a lithium-ion battery or an electrochemical cell.

The present invention further relates to a cathode for a lithium-ion battery, comprising at least one spherical particle or agglomerate or at least one compound according to general formula (I) obtainable/preparable by the process according to the present invention. To obtain a cathode as mentioned above the compound according to general formula (I) is mixed with at least one electrically conducting material, described for example in WO 2004/082047.

Suitable electrically conducting materials are for example carbon black, graphite, carbon fibres, carbon nanofibres, carbon nanotubes or electrically conducting polymers. Typically 2.0 to 40% by weight of the at least one electrically conducting material are used together with the compound according to general formula (I) in the cathode. To obtain the cathode the electrically conducting material and the compound according to general formula (I) are mixed, optionally in the presence of an organic solvent and optionally in the presence of an organic binder, for example polyisobutene, and this mixture is optionally formed and dried. A temperature of 80 to 150° C. is preferably applied in the drying step.

In a preferred embodiment at least a part of the at least one electrically conducting material or at least one precursor of an electrically conducting material is added during the preparation of compounds according to general formula (I) as mentioned above. In a preferred embodiment, at least a part of the at least one electrically conducting material or at least one precursor of an electrically conducting material is added to the mixture of the starting materials in the preparation of the compound according to general formula (I). The remaining part of the least one electrically conducting material or at least one precursor of an electrically conducting material, which has not been added during the preparation of compounds according to general formula (I), is added after this preparation.

Therefore, the present invention also relates to a process for the preparation of a mixture comprising at least one compound according to general formula (I) as defined above and at least one electrically conducting material comprising the following steps (D) providing an essentially aqueous mixture comprising at least one electrically conducting material or at least one precursor of an electrically conducting material, at least one lithium-comprising compound, FeOOH as the iron-comprising compound and at least one $M^1$-comprising compound, if present, and/or at least one $M^2$-comprising compound, if present, and/or at least one $M^3$-comprising compound, if present, at least one compound comprising at least one phosphorous atom and at least one reducing agent, (E) drying the mixture provided in step (D), in order to obtain a solid compound and (F) calcining the solid compound obtained from step (E) at a temperature of 300 to 950° C.

The lithium-, $M^1$, $M^2$ and/or $M^3$-comprising compounds, FeOOH as the iron-comprising compound, the at least one compound comprising at least one phosphorous atom and the at least one reducing agent, which is preferably water soluble, the electrically conductive materials, the apparatuses and the process parameters of the steps (D) to (F) correspond to the ones described above.

In a preferred embodiment the electrically conducting material is chosen from the group consisting of carbon black, graphite, carbon fibres, carbon nanofibres, carbon nanotubes, electrically conducting polymers or mixtures thereof. The at least one precursor of an electrically conducting material is preferably chosen from compounds that can be reacted into carbon by pyrrolysis during the preparation of the mixture according to the present invention, for example polyethylene, polypropylene, glucose, fructose, succhrose, saccharose, xylose, sorbose, lactose, starch, cellulose and its esters, block polymers of ethylene and ethylene oxide and polymers of furfuryl alcohol, or mixtures thereof. Especially preferred are water soluble carbon precursors.

Compounds which are mentioned in respect of carbon containing reducing agents and in respect of precursor compounds of electrically conducting materials can fulfil both functions, reducing the FeOOH to obtain Fe(II) and being converted into carbon which is present in the mixture obtained as electrically conducting material.

If carbon black, graphite or substances essentially consisting of carbon are used as electrically conducting materials in step (D), these materials are preferably suspended in an essentially aqueous mixture, preferably an essentially aqueous solution or dispersion, of the other components. This can be achieved by direct addition of these electrically conducting materials to the essentially aqueous mixture of the other components. Alternatively, carbon black, graphite or substances essentially consisting of carbon can be suspended in an essentially aqueous solution of hydrogen peroxide, and this suspension can then be added to a solution or dispersion of one or more components as mentioned above. Treatment with hydrogen peroxide normally improves the wettability of carbon with water and makes it possible to obtain carbon containing suspensions having an improved stability, i.e. having a lower tendency for demixing. In addition the homogenous dispersion of the electrically conducting material in the mixture is improved. By further stirring and/or heating of the essentially aqueous suspension the excess hydrogen peroxide is decomposed into water and oxygen in the catalytic presence of the Li-, Fe- and/or P-containing precursors.

Alternatively, instead of hydrogen peroxide or in addition to hydrogen peroxide, surfactants can be used in order to disperse the substances essentially consisting of carbon. Suitable surfactants are known to a person having ordinary skill in the art, like block copolymers of ethylene oxide and/or propylene oxide, for example surfactants which are commercially available under the trade name Pluronics® of BASF SE.

If at least one precursor of an electrically conducting material is used, this at least one precursor can be used without the addition of at least one electrically conductive material or, optionally, in mixture with at least one electrically conductive material.

The present invention also relates to a mixture, comprising at least one compound according to general formula (I) as defined above and at least one electrically conducting material, preparable by a process as mentioned above. In contrast to materials according to the prior art, these mixtures according to the present invention show an improved dispersion of the at least one electrically conducting material within the spherical agglomerates of the resulting material. This improved C-dispersion leads to a highly electrically conductive perculation network of carbon within the cathode material powder according to the present invention and in addition to an improved electrical conductivity of the layer like electrode. The mixture comprising at least one compound according to general formula (I) and at least one electrically conducting material in general has BET surface area which is determined by the kind and the amount of the additional carbon within the mixture and may vary from 0.1 to 500 m$^2$/g.

The present invention further relates to spherical particles or agglomerates comprising the mixture, comprising at least one compound according to general formula (I) as defined above and at least one electrically conducting material, preparable by a process as mentioned above. The characteristics concerning size, porosity etc. are in accordance with the spherical particles or agglomerates comprising no electrically conducting material as defined above.

Therefore, the present invention also relates to the use of a mixture as mentioned above or of spherical particles or agglomerates comprising the mixture, comprising at least one compound according to general formula (I) as defined above and at least one electrically conducting material for the preparation of a cathode of a lithium-ion battery or an electrochemical cell.

The present invention also relates to a cathode for a lithium-ion battery, comprising a mixture or spherical particles or agglomerates comprising the mixture as mentioned above.

For the preparation of a cathode using the compound according to general formula (I) as mentioned above or a mixture comprising the compound according to general formula (I) or spherical particles or agglomerates as mentioned above and at least one electrically conducting material as mentioned above, in a preferred embodiment the following binders are used:

Polyethyleneoxide (PEO), cellulose, polyethylene, polypropylene, polytetrafluoroethylene, polyacrylonitrile-methylmethacrylate, styrene-butadiene-copolymers, tetrafluoroethylene-hexfluoropropylene-copolymers, polyvinylidenefluoride-hexafluoropropylene-copolymers (PVdF-HFP), perfluoroalkyl-vinylether-copolymers, vinylidenefluoride-chlorotrifluoroethylene-copolymers, ethylene-chlorofluoroethylene-copolymers, ethylene-acrylic acid-copolymers (with and without sodium ions included), ethylene-methacrylic acid (with and without sodium ions included), polyimides and polyisobutene.

The binder is normally added in an amount of 1 to 10% by weight, preferably 2 to 8% by weight, particularly preferred 3 to 7% by weight, in each case based on the whole cathode material.

FIGURES

FIGS. 1 to 7 show scanning electron microscope (SEM) pictures of the compounds and mixtures obtained in the following examples.

EXAMPLES

The present invention is further illustrated by the following examples:

Example 1

LiFePO$_4$ from LiOH.H$_2$O, α-FeOOH, and H$_3$PO$_4$ (stoichiometric, 2 h stirring, succhrose as reductant, in situ-pyrolysis of the additional succhrose leads to about 9 weight-% of carbon)

$$2\ \text{LiOH.H}_2\text{O} + 2\ \text{Fe}^{3+}\text{OOH} + 2\ \text{H}_3\text{PO}_4 \rightarrow 2\ \text{LiFe}^{2+}\text{P}^{5+}\text{O}_4$$

In a 10 L-glass-reactor which is heatable from the outside, 6 L water are placed at 80° C. under streaming N$_2$ (50 NL/h). The streaming N$_2$-cover is maintained during the further process. Under stirring 174.97 g LiOH.H$_2$O (57.49% LiOH, 4.2 mol Li, Chemetall GmbH, D-60487 Frankfurt, Germany) are added and dissolved to give a clear, colourless solution.

366.20 g α-FeOOH (61.0% Fe, BET=14 m²/g, 4.0 mol Fe; ZMAG-5102, CATHAY PIGMENTS (USA) Inc., 4901 Evans Ave., Valparaiso, Ind. 46383, USA) are added. This α-FeOOH of the type ZMAG-5102 which is added shows a needle-shaped habitus having an average needle-length of 1 μm and an average needle-diameter of 100-200 nm in the transmission electron microscopy. Subsequently, 461.18 g H₃PO₄ (85%, 4 Mol P, Riedel-de-Haen, D-30926 Seelze) and 250.0 g saccharose (succhrose, $C_{12}O_{11}H_{22}$, 0.73 mol, Riedel-de-Haen, D-30926 Seelze, Germany) are added to the amber essentially aqueous suspension during 0.5 minutes and dissolved under further stirring. The essentially aqueous suspension obtained is stirred for 16 hours at 90° C. under streaming nitrogen and has a pH of 5.6. The yellow suspension is subsequently spray-dried under nitrogen in a spray-dryer (type Minor MM, Niro, Danmark) (temperature at the inlet=330° C., temperature at the outlet=106° C.).

50 g of the obtained spray-powder are subsequently added to a continuously rotating (7 rpm) 1 L-quartz glass bubble under streaming nitrogen (15 NL/h) in a laboratory rotary furnace (BASF) and heated in one hour to an end temperature T, is hold at this temperature T for one hour and is subsequently cooled to room temperature under streaming $N_2$.

Example 1.1

Figure 1:
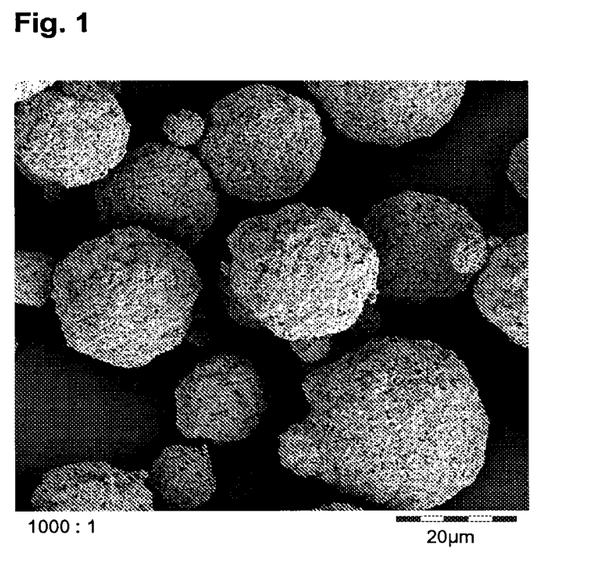
FIGS. 1 and 2 show SEM pictures of powders obtained after calcination at 500° C., consisting of primary particles of LiFePO$_4$ having the crystalline structure of orthorhombic triphylite and additionally incorporated carbon black.
Figure 2:
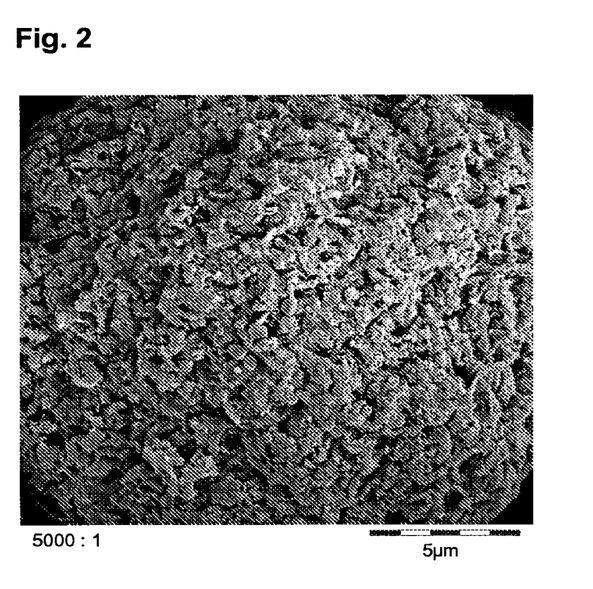

The end temperature T of 500° C. gives rise to a powder having a BET-surface of 84 m²/g. The X-ray powder diffraction pattern shows the monophasic crystal structure of orthorhombic LiFePO₄ (triphylite). The oxidation state of the iron is $Fe_{ox}$=2.05. Chemical composition of the lithium-iron-phosphate obtained shows $Li_{1.03}Fe(PO_4)_{0.99}$. The amount of carbon is 9.3% by weight. Scanning electron microscopy shows that the powder has a spherical habitus having a medium spherical size of about 30 μm. The single sphericals consist of primary particles of LiFePO₄, wherein cavities are between the primary particles (FIGS. 1 and 2).

Example 1.2

Figure 3:
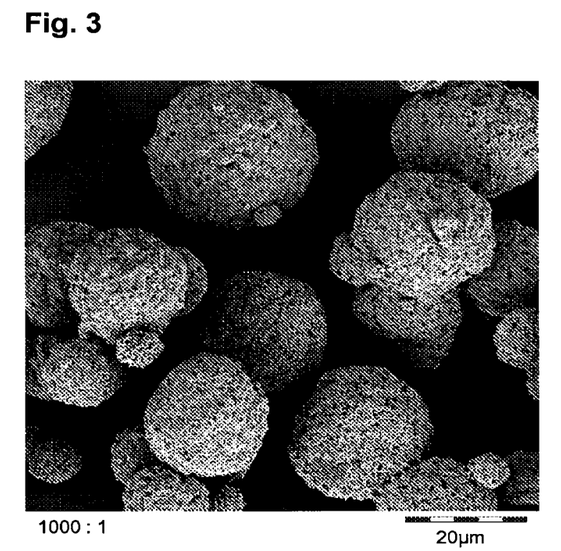
FIGS. 3 and 4 show SEM pictures of powder obtained after calcination at 700° C., consisting of primary particles of LiFePO$_4$ having the crystalline structure of orthorhombic triphylite and additionally incorporated carbon black.
Figure 4:
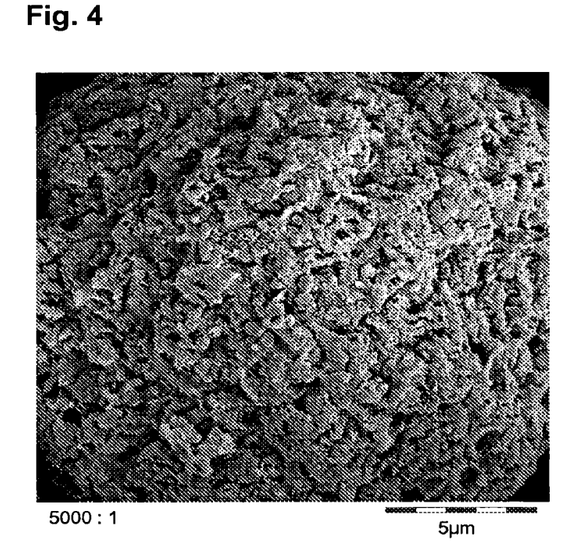

The end temperature T of 700° C. gives rise to a powder having a BET-surface of 87 m²/g. The X-ray powder diffraction pattern shows a single phase with the crystal structure of orthorhombic LiFePO₄ (triphylite). The oxidation state of the iron is $Fe_{ox}$=2.02. Chemical composition of the lithium-iron-phosphate obtained shows $Li_{1.05}Fe(PO_4)_{1.00}$. The amount of carbon is 9.0% by weight. Scanning electron microscopy shows that the powder has a spherical habitus having a medium spherical size of about 30 μm. The single sphericals consist of primary particles of LiFePO₄, wherein cavities are between the primary particles (FIGS. 3 and 4).

Example 1.3

Figure 5:
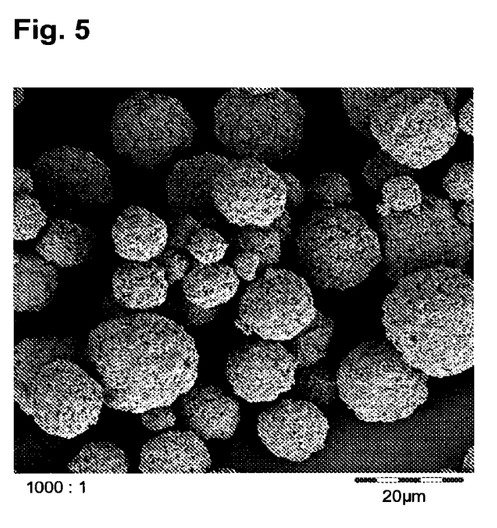
FIGS. 5, 6 and 7 show SEM pictures of powder obtained after calcination at 800° C., consisting of primary particles of LiFePO$_4$ having the crystalline structure of orthorhombic triphylite and additionally incorporated carbon black.
Figure 6:
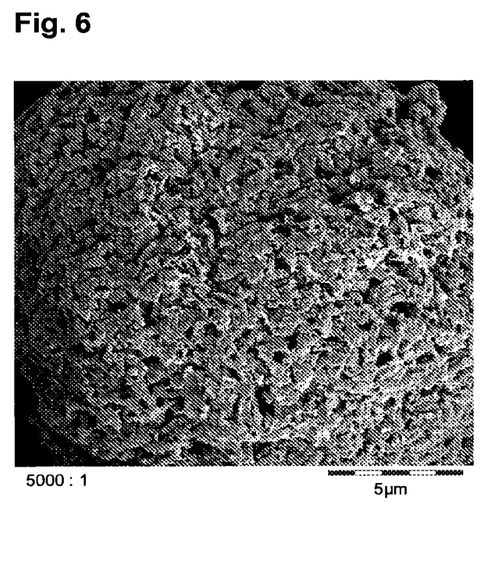
Figure 7:
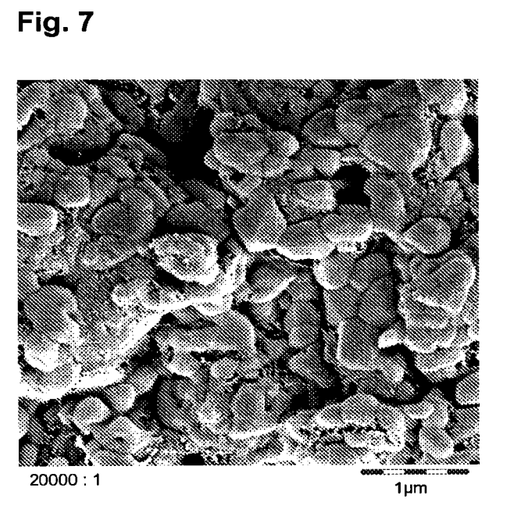

The end temperature T of 800° C. gives rise to a powder having a BET-surface of 86 m²/g. The X-ray powder diffraction pattern shows a single phase with the crystal structure of orthorhombic LiFePO₄ (triphylite). The oxidation state of Fe is $Fe_{ox}$=2.00. Chemical composition of the lithium-iron-phosphate obtained shows $Li_{1.05}Fe(PO_4)_{0.99}$. The amount of carbon is 8.7% by weight. Scanning electron microscopy shows that the powder has a spherical habitus having a medium spherical size of about 30 μm. The single sphericals consist of primary particles of LiFePO₄, wherein cavities are between the primary particles. The diameter of the primary particles is about 300-500 nm (FIGS. 5 to 7).

The invention claimed is:

1. A process for the preparation of a compound represented by formula (I)

$$Li_{a-b}M^1_bFe_{1-c}M^2_cP_{d-e}M^3_eO_x \qquad (I),$$

wherein M¹, M², M³, a, b, c, d, e and x:
M¹: Na, K, Rb and/or Cs,
M²: Mn, Mg, Ca, Ti, Co, Ni, Cr, V,
M³: Si, S,
a: 0.8-1.9,
b: 0-0.3,
c: 0-0.9,
d: 0.8-1.9,
e: 0-0.5,
x: 1.0-8, depending on the amount and oxidation state of Li, M¹, Fe, M², P, M³, wherein said compound represented by formula (I) is neutrally charged,
comprising
drying an essentially aqueous mixture comprising at least one lithium-comprising compound, FeOOH as iron-comprising compound and at least one M¹-comprising compound, if present, and/or at least one M²-comprising compound, if present, and/or at least one M³-comprising compound, if present, at least one compound comprising at least one phosphorous atom and at least one reducing agent which is carbon free, calcining the solid compound obtained at a temperature of 300 to 950° C.

2. The process according to claim 1, wherein said at least one reducing agent is water-soluble.

3. The process according to claim 1, wherein FeOOH is selected from the group consisting of α-FeOOH, β-FeOOH, γ-FeOOH and a mixture thereof.

4. The process according to claim 1, wherein said at least one compound comprising at least one phosphorous atom is selected from the group consisting of H₃PO₄, (NH₄)H₂PO₄, (NH₄)₂HPO₄, (NH₄)₃PO₄, Li₃PO₄, LiH₂PO₄, Li₂HPO₄ and a mixture thereof.

5. The process according to claim 1, wherein said drying is conducted by spray-drying.

6. The process according to claim 1, wherein said essentially aqueous mixture further comprises at least one electrically conducting material or at least one precursor of an electrically conducting material.

7. The process according to claim 6, wherein an electrically conducting material is present and is selected from the group consisting of carbon black, graphite, a carbon fiber, a carbon nanofiber, a carbon nanotube, an electrically conducting polymer and a mixture thereof.

* * * * *